(12) United States Patent
Tunning et al.

(10) Patent No.: US 7,359,905 B2
(45) Date of Patent: Apr. 15, 2008

(54) RESOURCE CLASSIFICATION AND PRIORITIZATION SYSTEM

(75) Inventors: Brian R. Tunning, San Francisco, CA (US); Jennifer R. Wise, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 10/602,574

(22) Filed: Jun. 24, 2003

(65) Prior Publication Data

US 2004/0267762 A1    Dec. 30, 2004

(51) Int. Cl.
G06F 7/00 (2006.01)
G06F 17/00 (2006.01)

(52) U.S. Cl. ............................. 707/100; 707/3; 707/6; 705/37

(58) Field of Classification Search .................... 707/3, 707/6, 100; 705/37
See application file for complete search history.

(56) References Cited

U.S. PATENT DOCUMENTS

| | | | | |
|---|---|---|---|---|
| 5,321,815 A * | 6/1994 | Bartolanzo et al. | ......... | 709/241 |
| 5,946,683 A * | 8/1999 | Rastogi et al. | ................. | 707/6 |
| 6,212,517 B1 * | 4/2001 | Sato et al. | ...................... | 707/5 |
| 6,321,207 B1 * | 11/2001 | Ye | ................................ | 705/8 |
| 6,668,256 B1 * | 12/2003 | Lynch | ......................... | 707/101 |
| 6,850,891 B1 * | 2/2005 | Forman | .......................... | 705/7 |
| 6,877,003 B2 * | 4/2005 | Ho et al. | ....................... | 707/7 |
| 7,039,176 B2 * | 5/2006 | Borodow et al. | ...... | 379/265.02 |
| 2002/0032638 A1 * | 3/2002 | Arora et al. | ................... | 705/37 |
| 2002/0087979 A1 * | 7/2002 | Dudkiewicz et al. | ......... | 725/34 |
| 2002/0087987 A1 * | 7/2002 | Dudkiewicz et al. | ......... | 725/46 |
| 2002/0092031 A1 * | 7/2002 | Dudkiewicz et al. | ....... | 725/138 |
| 2002/0100046 A1 * | 7/2002 | Dudkiewicz | ................. | 725/46 |
| 2002/0138399 A1 * | 9/2002 | Hayes et al. | ................... | 705/37 |
| 2002/0138481 A1 | 9/2002 | Aggarwal et al. | | |
| 2002/0152463 A1 * | 10/2002 | Dudkiewicz | ................. | 725/46 |
| 2003/0130887 A1 * | 7/2003 | Nathaniel | ..................... | 705/14 |
| 2004/0068339 A1 * | 4/2004 | Cheetham et al. | ............. | 700/99 |
| 2004/0133560 A1 * | 7/2004 | Simske | .......................... | 707/3 |
| 2004/0236725 A1 * | 11/2004 | Amitay et al. | .................. | 707/3 |

FOREIGN PATENT DOCUMENTS

WO    WO 01/75736    11/2001

OTHER PUBLICATIONS

Keller, et al.; "A Predicate-based Caching Scheme for Client-Server Database Architectures", 1994 IEEE; pp. 229-238.
Frank, "Data Mi8ning Practical Machine Learning Tools and Techniques With Java Implementations"; 2000, XP002298729, p. 47 and p. 246.

\* cited by examiner

*Primary Examiner*—Tim Vo
*Assistant Examiner*—Jay A Morrison
(74) *Attorney, Agent, or Firm*—Lee & Hayes, PLLC

(57) ABSTRACT

Subject matter includes an extensible information system, such as an exemplary content management system, and related methods for classifying, prioritizing, and localizing resources and associated content elements. The subject matter allows content to be described, classified, prioritized, and localized with increased flexibility and extensibility over conventional techniques without having to change a data structure of an exemplary content management system hosting the subject matter.

21 Claims, 13 Drawing Sheets

ADDITION OF ADDITIONAL ATTRIBUTE WOULD REQUIRE ALTERATION OF DATABASE STRUCTURE.

| First Attribute Column 202 | Second Attribute Column 204 | Third Attribute Column 220 |
|---|---|---|
| Language 206 | Country 208 | New Attribute 218 |
| English 210 Spanish 212 | Canada 214 Mexico 216 | New Value 222 New Value 224 |

200

LOCALIZATION OF RESOURCES 226

→ LOCALIZATION LIMITED TO TWO ATTRIBUTES.

*Fig. 2* (Prior Art)

RESOURCE CLASSIFICATION AND PRIORITIZATION SYSTEM

TECHNICAL FIELD

The subject matter relates generally to information systems and more specifically to a resource classification and prioritization system.

BACKGROUND

Content management systems can help users and administrators to classify data so that intelligible and relevant information may be returned to a specific type of user. For example, a worldwide email system might be able to access resources from many different countries and in many different languages. A user, however, may not need different language versions of the same content or versions of the same content adapted for different cultures. By localizing the content for a particular user or type of user, it is possible to greatly reduce the universe of information to be presented to the user. Localizing content for a user may be thought of as either gathering desirable information elements together from an undesirably large universe of information, or conversely, filtering out undesirable information elements from a pre-existing set of desirable information elements.

FIG. 1 shows a conventional manner of localizing resources for a user or application. Within an information universe 100, a common attribute is applied in a filtering process to localize a target environment for a user that is made up of a localized subset 102 of information resources that have the common attribute. A user query 104, for example, can then operate within those information resources in the localized subset 102 that comprise the user's environment.

In the context of an application that has access to information resources on a worldwide scale, one attribute for creating a localized subset 102 of information resources is language. Another attribute for creating a localized subset 102 of information resources is the associated country or geopolitical setting of a user or a resource. These two attributes, language and country, are conventionally used for localizing information resources, but provide only a rough localization, even when combined.

FIG. 2 shows a conventional database 200 for arranging attributes used to localize information resources. The conventional database 200 is typically represented by a table having a first attribute column 202 and a second attribute column 204. The first attribute column 202 is typically reserved for the localizing attribute, "language" 206. Fields for "language" values, such as English 210 and Spanish 212 are provided. The second attribute column 204 is typically reserved for the localizing attribute, "country" 208. Fields for "country" values, such as Canada 214 and Mexico 216 are provided. In a typical conventional content management system, the conventional database 200 has capacity for only the two attributes, and applications using the conventional database 200 are often dependent on this conventional database structure.

As shown in FIG. 3, a localization of resources by adding a language attribute value, such as "Spanish" 212, to a country attribute value, such as Mexico 216 results in a localization to only those "Spanish" and "Mexico" resources 302 in the intersection of sets wherein a resource has both an attribute of "Spanish" 212 and an attribute of "Mexico" 216.

Such a localization is an improvement over the non-localized entire universe of information resources 100, but is still not very specific.

Returning to FIG. 2, to add a third, new attribute 218 for further localizing resources beyond "Spanish" 212 and "Mexico" 216 attributes would require changing the structure of the conventional database 200 to add a third attribute column 220 reserved for the new attribute 218 and new fields for the new attribute values 222, 224. Not only is this difficult to implement if applications are dependent on the structure of the conventional database 200, but the structure of the conventional database 200 would have to be changed every time an attribute is added or subtracted from the structure. Further, using multiple attributes is conventionally avoided because numerous attributes increase the chance for an inaccurate localization as some attributes of lesser importance may be overrepresented compared to others that should be primary determinants of localization results.

SUMMARY

Subject matter includes an extensible information system, such as an exemplary content management system, and related methods for classifying, prioritizing, and localizing resources and associated content elements. The subject matter allows content to be described, classified, prioritized, and localized with increased flexibility and extensibility over conventional techniques without having to change a data structure of an exemplary content management system hosting the subject matter.

BRIEF DESCRIPTION OF THE DRAWINGS

FIG. 2 is a graphic representation of a conventional attribute table for localizing information.

DETAILED DESCRIPTION

Figure 1:
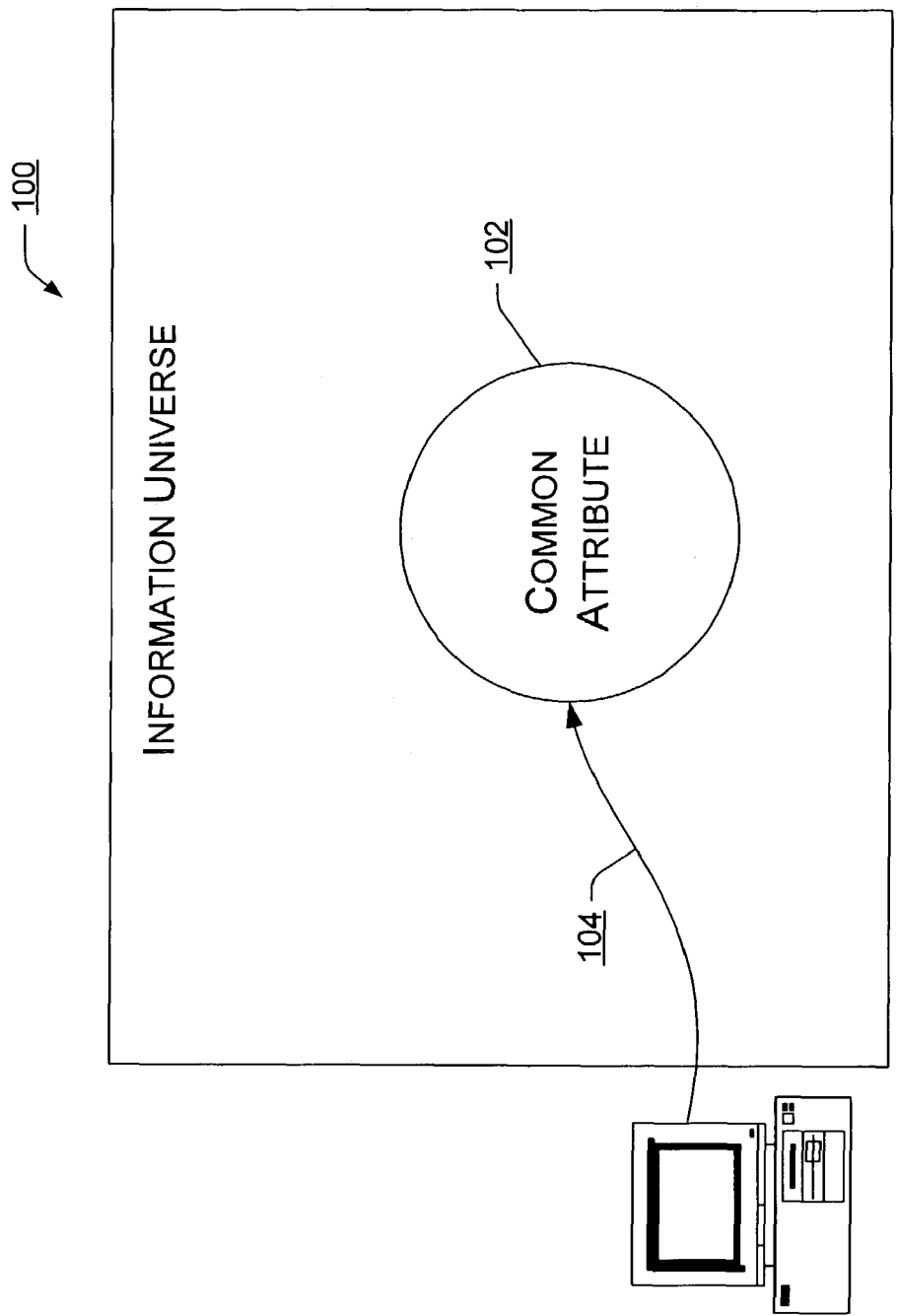
FIG. 1 is a graphic representation of a conventional method of localizing information.
Figure 3:
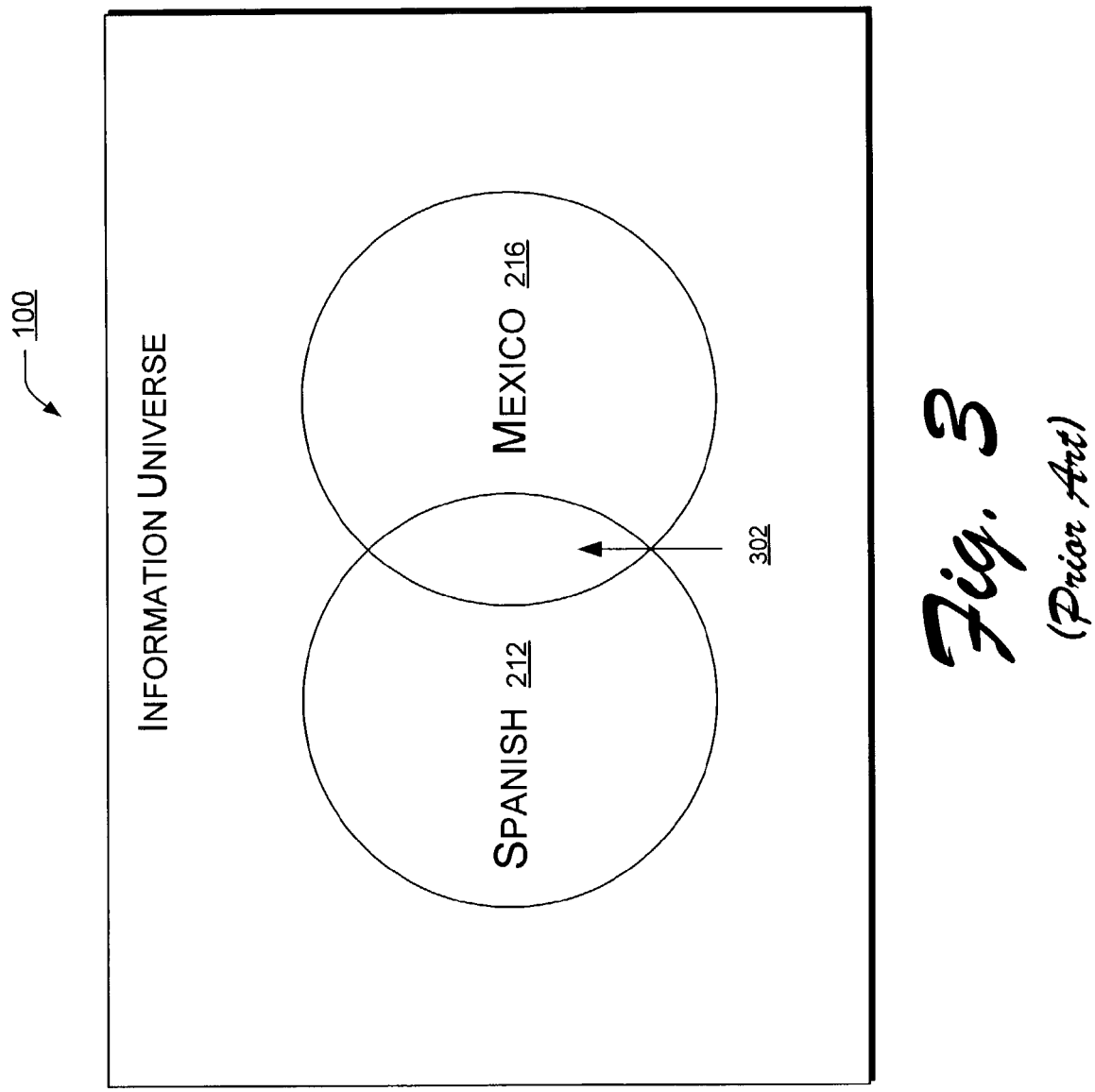
FIG. 3 is a graphic representation of a conventional method of localizing information using two attributes.

The disclosed subject matter provides an extensible information system, such as an exemplary content management system, and related methods for classifying, prioritizing, and localizing resources and associated content elements. The subject matter allows content to be described, classified, prioritized, and localized with increased flexibility and extensibility over conventional techniques without having to change a data structure of an exemplary content management system hosting the subject matter.

In one implementation, the subject matter uses an exemplary database structure for classifying attributes and values applicable to resources and their content elements. A first table defines attributes and priorities for a resource or a content element and a second table defines values for the attributes. A third table brings attributes and attribute values together to form sets of localization target criteria. Because values are stored in an extensible part of the database structure—such as a dynamic number of row entries in a table, rather than in a fixed part of the database structure, such as fixed columns representative of a fixed record or field—classification, prioritization, and localization can occur against a variable number of attributes without prior knowledge of the specific fields in a particular table. Using priorities, an exemplary system can intelligently return content elements information that are localized to the characteristics and needs of a particular user. Additionally, users can easily add new attributes using an implementation of the subject matter without writing new code or changing the database structure of an exemplary system.

The content elements returned to a user by an exemplary system can be information in a variety of forms, such as stored data, data packets, search results, web content, inventory items, etc., that can be classified according to inherent or assigned attributes. The content elements in an example resource, such as a link to a magazine article may have content elements each representing a version of the magazine article, e.g., one version for adults, one for children, one in English, one in French, and various combinations thereof. Data structures will be described herein that allow quick, flexible, accurate, and extensible classification, prioritization, and localization of such content elements.

Localization as used herein refers to a process wherein a subset of the above-mentioned content elements in a system is selected, partitioned, filtered, directed, and/or marked for a particular population of users, market, and/or a particular need. Thus, a localization target (herein "target") is a population of users or a particular need to which localized resources and/or content elements are directed. A localization of resources or content elements is effected according to a set of localization criteria (herein "target criteria" or "target criteria set"), usually composed of one or more attribute values that describe the target population or need. The resources and/or content elements to be localized are imbued with attribute values that describe a target. Hence, a target criterion composed of a language attribute value of "Japanese" localizes content elements having the "Japanese" attribute value and also describes the target (the population of users to which content will be directed), that is, localization criteria are attribute values that describe the target and the resources directed to the target. A set of localized content elements and/or the resources that include the content elements is also sometimes referred to as an "environment." To summarize, localization creates a subset of content elements directed to a target (a population of users or a particular need) according to target criteria, which are attribute values describing the target.

A resource can be thought of as a logical unit of content or a means for obtaining content, but not the content itself, for example, a text string space in a certain memory location, a header position in a webpage, a paragraph, a link, an image, an image with a link, an error string, etc. A resource may exist and be localized for a particular user or purpose even if the resource does not include content elements. An instance is a specific content element that exists in a resource.

An exemplary content management system described herein provides for localization according to a potentially unlimited number of attributes for resources and/or content elements. The number of attributes that can be selected as a set of localization criteria is dynamic and, as mentioned, can be changed without altering the data structure of an exemplary system hosting the subject matter.

Further, each attribute selected for localizing content in the exemplary system can be assigned a weight ("priority") so that important attributes are influential in achieving a given localization and attributes of lesser significance do not unintentionally skew localization results.

The instant subject matter may be applied to many localization techniques. In some systems, localization may be implemented by considering each resource and/or content element in a system and marking those content elements that are to be members of a localization subset (e.g., storing a marker with the content element). In another technique, localization may be implemented by marking resources and/or content elements in a system as potential members of potential localizations. This may be accomplished, for example, by storing with each resource and/or content element an identification number of a preferred associated set of localization target criteria, e.g., those attributes and/or attribute values to be used in a localization that particularly apply to the specific content element. In other systems, localization may be implemented "on the fly" by considering resources and content elements in real time and filtering out resources and/or content elements that do not fit the localization target criteria (do not have an attribute value designated in the localization criteria). In yet other systems, localization may be implemented by sequestering or physically storing content elements in a special space, for example, by writing elected content elements to a designated directory on a hard drive, etc.

The instant subject matter can be implemented by an exemplary mapping technique, which can be represented by a series of relationships between data tables. These will now be described.

Figure 4:
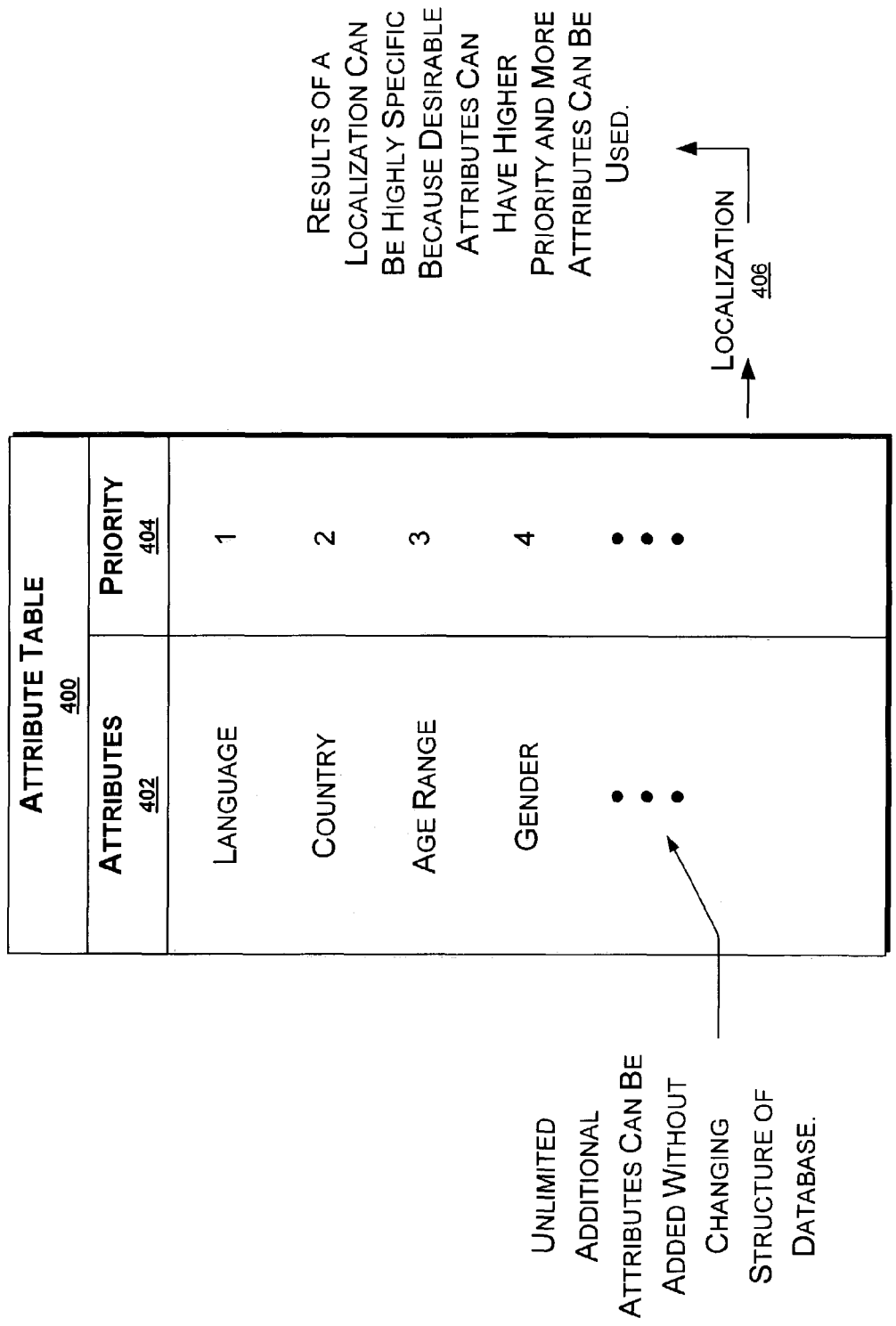
FIG. 4 is a graphic representation of an exemplary attribute table according to one aspect of the subject matter.

FIG. 4 shows an exemplary attribute table 400 for an exemplary content management system. Instead of each attribute constituting an essential column of a database structure, as in the conventional database 200, wherein a change in the number of attributes requires a change of database structure, in an exemplary attribute table 400 there is only one attribute column 402. Various attributes may be added (without limit) and deleted from the exemplary attribute table 400 without requiring a change in database structure. Instead of relating attribute values to each attribute in an exemplary attribute table 400, each attribute is related to a user-selectable priority 404, which may be used for weighting purposes during a localization 406. A localization according to attributes in the exemplary attribute table 400 can be executed with greater specificity than with a conventional database 200, because more attributes can be enlisted for localization 406 and each attribute can exert a weighted influence on the localization according to its priority 404.

Figure 5:
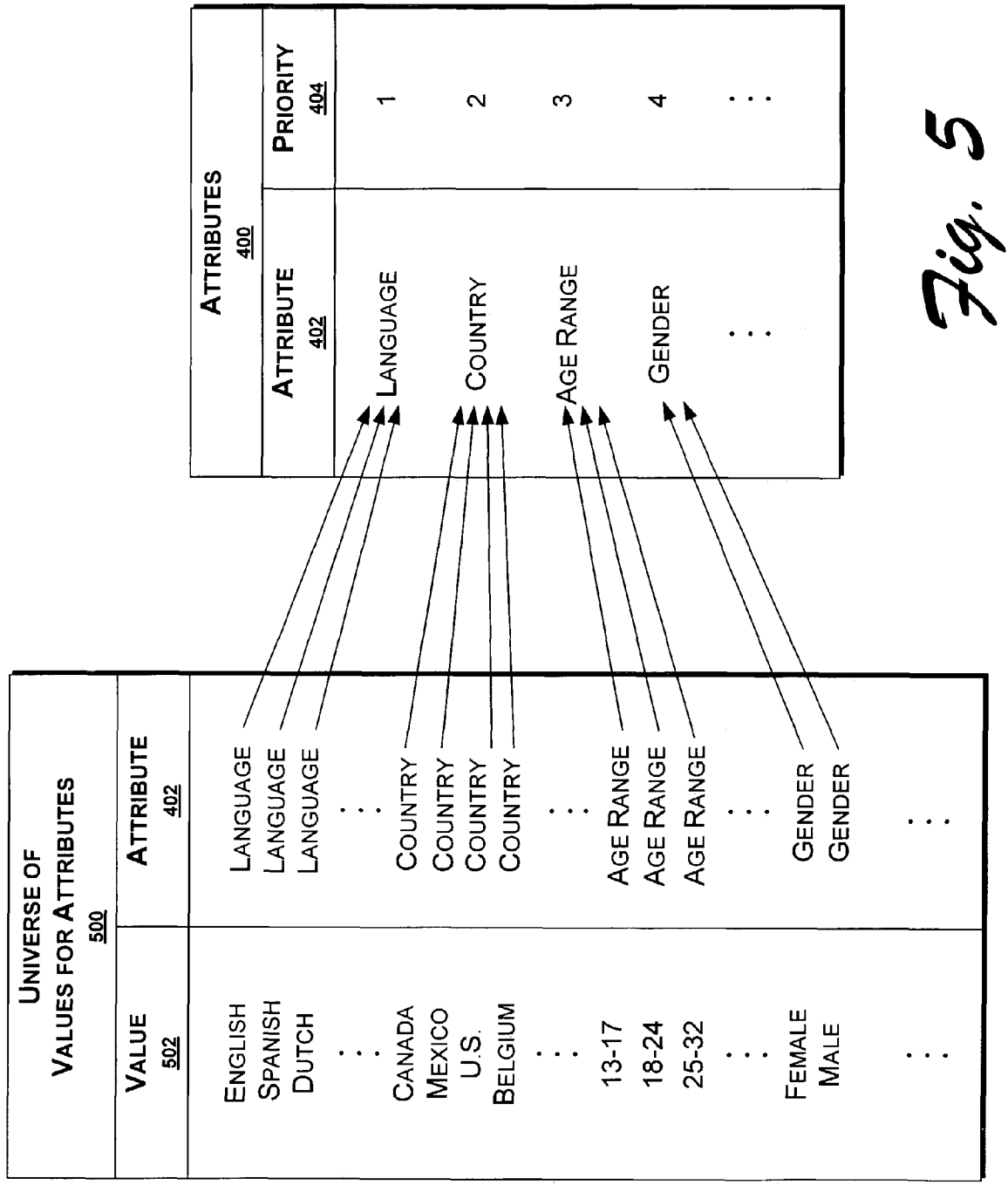
FIG. 5 is a graphic representation of an exemplary universe of values for the attributes in the exemplary attribute table of FIG. 4, according to one aspect of the subject matter.

FIG. 5 shows an exemplary values table 500 for the exemplary attributes table 400. In one implementation, the exemplary values table 500 encompasses a universe of values within a given content management system, that is, the exemplary values table 500 includes every value in use for every attribute in a particular content management system. The exemplary values table 500 does not usually include every possible value of an attribute, the term "universe" of values means a complete assortment of selected values "in use" in an exemplary system.

Part of the ability of an exemplary content management system to expand without changing its structure is that there is a place for all attributes in same exemplary values table 500. Rather than having one table for each attribute, e.g., one table for all possible colors, one table for all possible languages, etc., to make attributes useful, the instant subject matter provides a single exemplary values table 500. In a typical implementation, the exemplary values table 500 does not get unmanageably large. For example, a hypothetical email implementation of the subject matter might use an exemplary values table 500 that has approximately 250 rows to localize content according to attributes such as country, language, and perhaps one or two additional attributes.

In some implementations, a value is not placed in the exemplary values table 500 unless a resource includes an actual instance of a content element that possesses both the value and its associated attribute. Such implementations of the subject matter result in a content management system in which operations within localized content are reliable as to which resources and/or content elements exist and which do not. In other words, in such an implementation a user who obtains a result knows the result exists, and a user who does not obtain a certain result knows that the certain result does not exist in the system. Thus, an exemplary content management system is superior in its ability to indicate existence of particular content over many types of information search engines that only suggest a hypothetical fit between search criteria and results found, or suggest a degree of correlation between search criteria and items on a hit list.

In an exemplary values table 500, an attribute 402 such as "language" may have a dynamic number of associated values 502, such as English, Spanish, Dutch, etc., and the relationship between an attribute 402 and its associated values 502 may be implemented by storing each value 502 with a pointer to its associated 11 attribute 402, or storing the value 502 and an associated attribute 402 in pairs, etc. Hence, a value 502 may be looked up to find its associated attribute 402, and in an exemplary attribute table 400, the attribute obtained may be looked up to find its associated priority 404. Each attribute 402 in a dynamic and open-ended list of attributes 402, may each have a dynamic and open-ended list of values, that is, the list of values 502 may include a number of values for each of multiple attributes 402. In one extreme case, all the values 502 may have the same associated attribute 402, while in an opposite extreme case each value 502 may have a different associated attribute 402. As mentioned, if each value is placed in the exemplary values table 500 only when a value 502 is associated with an actual resource or an actual instance of content having the value, then the exemplary value table 500 becomes a full and complete universe of values in an exemplary content management system, in which the existence or nonexistence of a particular content element having a particular value 502 for an attribute 402 can be directly ascertained. More importantly, when numerous attributes 402 having respective priorities 404 are used in an exemplary content management system, the existence or nonexistence of a particular content element having a finely tuned mixture of values 502 for the attributes can be directly ascertained. For a user, this means that a communication tool, such as email, can be much faster and more efficient as the raw number of resources it must deal with (i.e., its environment) has been fine-tuned and greatly minimized a priori through very specific localization. It also means that the resources can be reliably accessed in implementations wherein resources are localized only if they exist. A user can reliably conclude that an unfound resource does not exist in the present localization. This may save a user the effort of reconfiguring searches and trying to second-guess search criteria.

Figure 6:
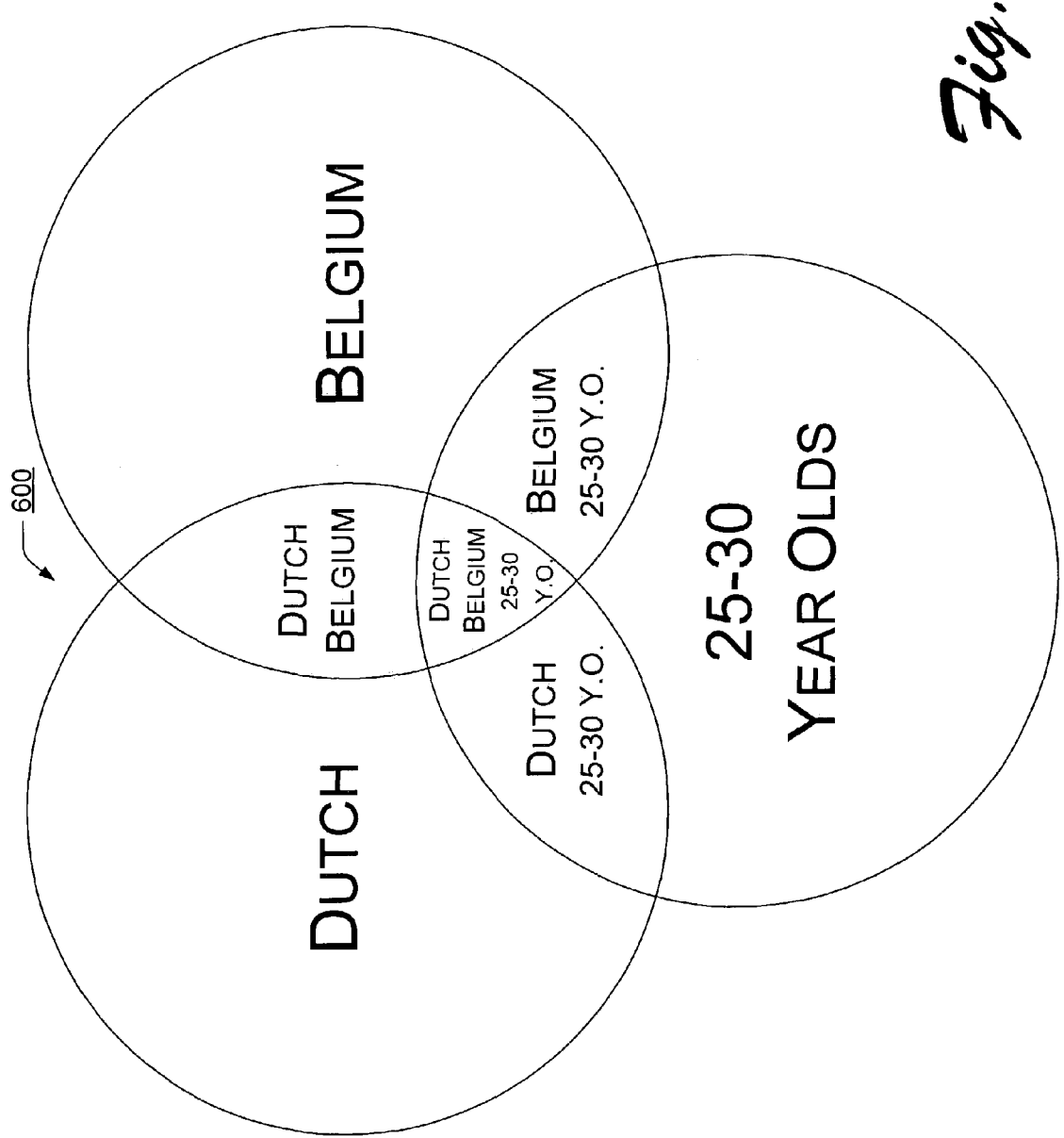
FIG. 6 is a graphic representation of an exemplary method of localizing information using more than two attributes, according to one aspect of the subject matter.

FIG. 6 shows an exemplary localization 600 according to one aspect of the subject matter, wherein three attributes 402 are used in localizing content. A language attribute having a value of "Dutch," a country attribute having a value of "Belgium," and an age range attribute having a value of "25-30 year olds" are intersected to localize those resources and/or content elements in an exemplary content management system having the respective attributes and values. Using the subject matter, a much smaller subset of content elements is localized than could be obtained by just using two attributes in a conventional system. Since any number of attributes may be used in an exemplary content management system, a very specific localization may be obtained, without altering the data structure of an exemplary content management system.

Figure 7:
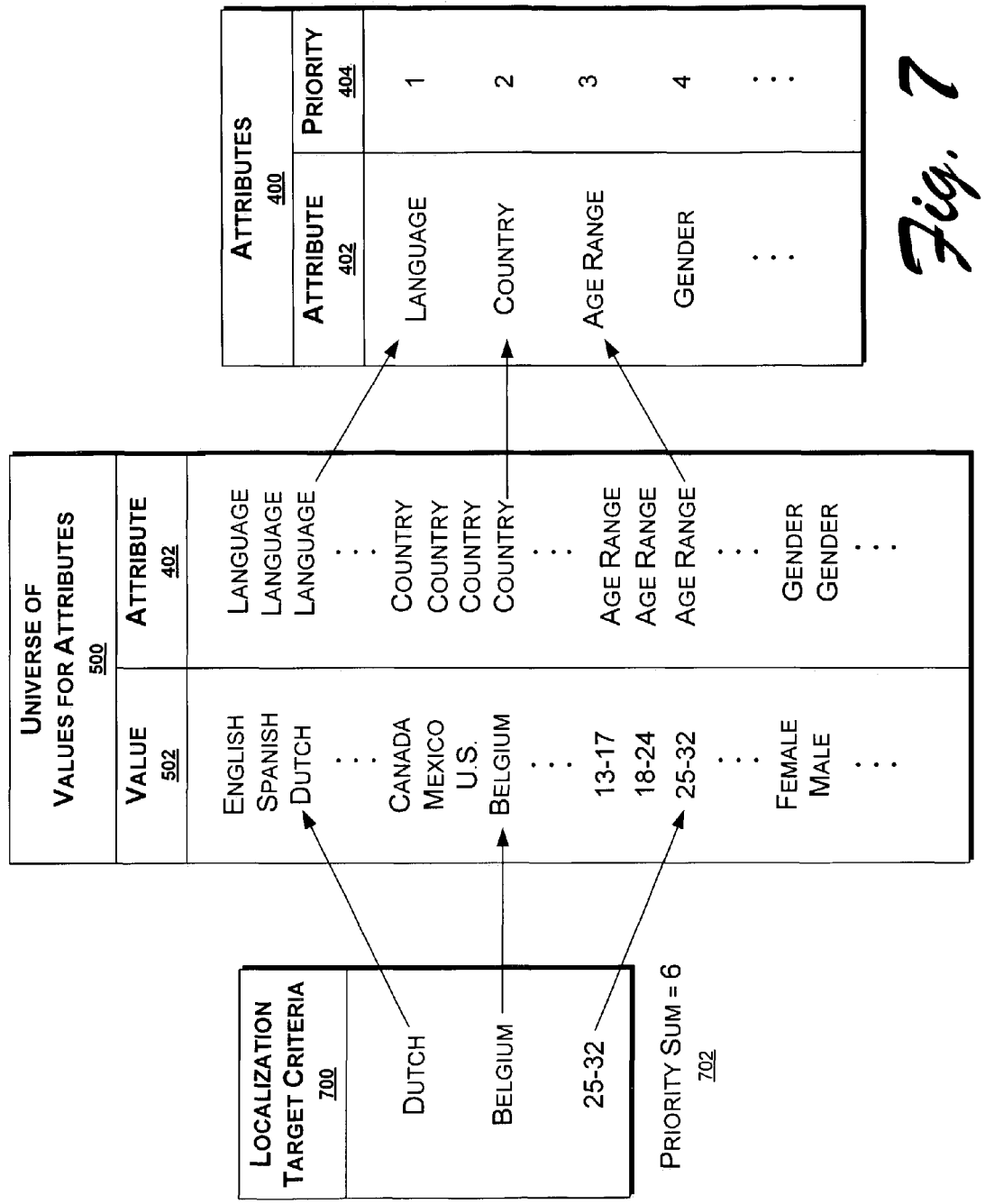
FIG. 7 is a graphic representation of exemplary localization target criteria.

FIG. 7 shows an exemplary set of localization target criteria 700 (also referred to herein as "target"), which are attribute values to be used to perform a localization. In an exemplary content management system, an exemplary set of localized target criteria 700 include one or more localization attributes, such as language, country, age range, etc., each having a value used as a criterion for the localization. Each value in an exemplary set of localized target criteria 700 is related to an attribute in an exemplary values table 500, which in turn is related to a priority for the attribute 402 in an exemplary attribute table 400. For example, within an exemplary target 700, "Dutch" may be a value for a language attribute assigned a priority of one, "Belgium" may be a value for a country attribute assigned a priority of two, and "25-30 year olds" may be a value for an age range attribute assigned a priority of three. When the priorities 404 are added together, the overall priority sum 702 for the exemplary target 700 adds up to six. To reiterate, the weight assigned to a given priority may be user-selectable. Actual priority sum results also depend on a particular weighting method used to rank attribute priorities. Depending on how the priorities 404 are assigned to the attributes 402 in the attribute table 400 and the weighting method employed, a higher priority sum 702 may indicate a more localized target environment 100 as more attributes and/or narrower attributes are considered in refining the localization, that is to say, a very specific attribute may result in a very high priority sum. However, since different weighting methods may be used to assign numbers to attribute priorities, in some implementations a lower priority sum may indicate a more specific localization.

Exemplary targets (that is, sets of localization target criteria, such as exemplary target 700) provide a flexible way of retrieving information in a data system. For example content elements may be ranked from more general to more specific as a function of how many attributes a particular content element has associated with it. A user can search for those content elements described by a certain attribute, such as "language." Or, a user can search for elements described (for instance) by at least four attributes. Similarly, a user could search for content elements described by attributes whose priority values add up to twelve. The subject matter allows for easy extensibility, and re-prioritization of attributes without changes to the structure of an exemplary content management system. Users can easily add new attributes and change their priority as desired.

It should be noted that in some implementations, the various values, attributes, and priorities in the exemplary tables (e.g., 400, 500) and target criteria sets (e.g., 700) can be mapped to each other using identification labels, instead of words from a human language such as English as illustrated. For instance, integers may be used as the identification labels: localization target criteria set "3" might contain value "2" for attribute "7," which has a priority of "4."

Also, in some implementations, a target criteria set (e.g., 700) is allowed by the exemplary system logic of the implementation to include only one value of each attribute (or of certain attributes) in a given target criteria set 700. Such an implementation would forbid, for example, a target criteria set 700 that includes a French value and an English value together. This is because a specific content element, such as a news clipping, is either written in English or French, but not both at the same time.

Figure 8:
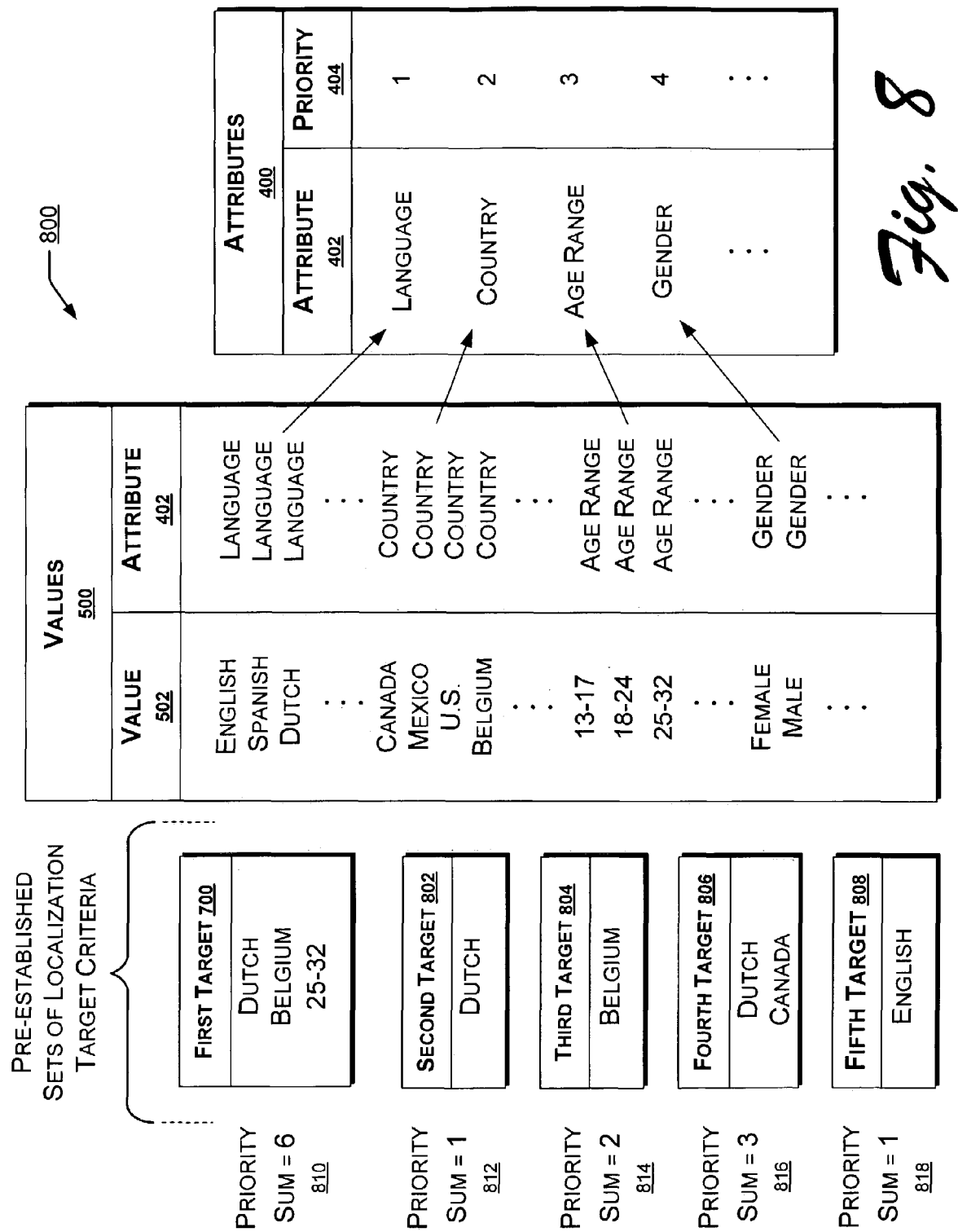
FIG. 8 is a graphic representation of a group of localization target criteria sets.

FIG. 8 shows an exemplary content management system 800 in which various pre-established or possible localizations have been performed according to assorted targets 700, 802, 804, 806, 808, each target having one or more localization attributes. When a localization is requested by a user or administrator, the exemplary content management system 800 may compare the priority sum 702 of the subject exemplary target being requested with the priority sums of the pre-existing or possible target environments 700, 802, 804, 806, 808 to see if any match or are close to the requested localization target. Thus, in some implementations an exemplary content management system 800 does not need to perform a localization from scratch when presented with a localization request, but might derive a localization from pre-existing "stock" localizations.

When presented with a localization request, for example, a request for a target environment that includes the attributes "Dutch," "Belgium," and "25-30 year olds," (attributes that may already exist in a pre-existing target, in this case the first target 700, for the sake of illustration) an exemplary content management system 800 may measure the closeness or alternatively the "distance" between the requested target localization and pre-established target environments 700, 802, 804, 806, 808 (for example, by subtracting the two). The requested target, which in this example is identical to the first target 700, has a priority sum of six 810. The distance between the requested target and the first target is therefore zero.

The second target environment 802 has a priority sum of one 812, so the distance between the requested target and the second target 802 is five. The third target 804 has a priority sum of two 814, so the distance between the requested target and the third target 804 is four.

The fourth target 806 has a priority sum of three 816, so the distance between the requested target and the fourth target 806 is three. However, in some implementations the fourth target environment 806 may be eliminated because its content will already have been localized to the intersection of Dutch and Canada, which is logically exclusive of results from the intersection of Dutch and Belgium (and 25-30 year olds). That is, since a value (Canada) for one of the requested attributes (country) in the fourth target 806 is different than a requested value (Belgium) for that attribute (country), and a value (Canada) has already been intersected with a requested value (Dutch) for another attribute (language) in the desired target environment 700, the localization effected by the fourth target 806 would form an empty set when intersected with a subset representing the desired target environment 700.

The fifth target 808 has a priority sum of one 818, so the distance between the requested target and the fifth target 808 is five. Even if the distance between a requested target and pre-existing targets (802, 804, 806, 808) is not zero (i.e., not an exact match), the distance calculations allow an exemplary content management system 800 to discern which pre-existing targets are closest to that requested, and localize resources accordingly.

If an exact, pre-established, target localization already exists (e.g., one with Dutch, Belgium, and "25-30 year old" values, such as the first target 700) then the comparison of priority sums will yield a zero distance, and resources of the matching target 700 can be used without further processing.

Figure 9:
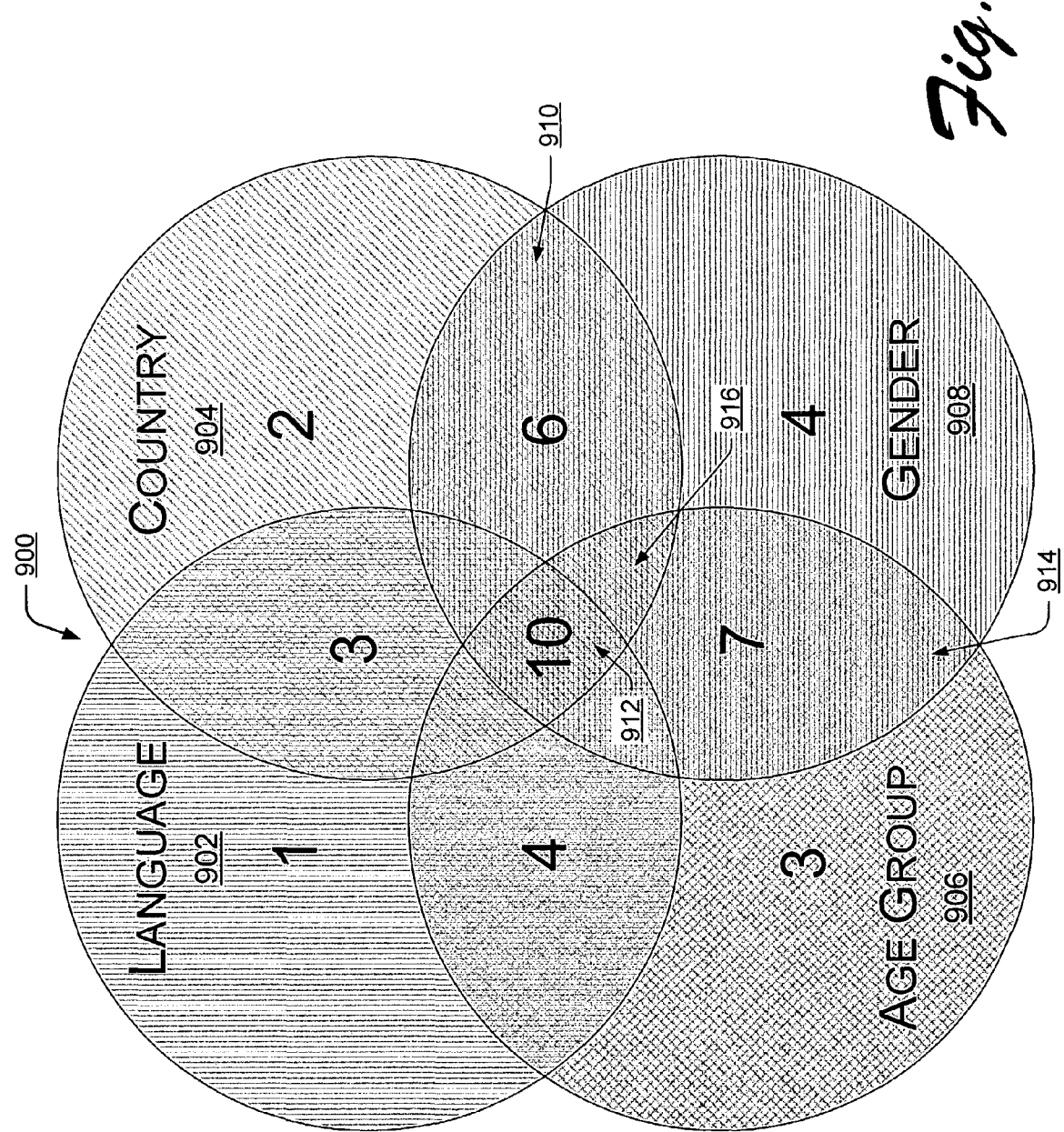
FIG. 9 is a graphic representation of an intersection of subsets of information resources.

FIG. 9 shows exemplary localization(s) 900 wherein multiple attributes, each having a localization priority assigned (e.g., as in exemplary attribute table 400), are intersected. The areas of overlapping attributes show the relative priority sums of those combinations of attributes intersected to form an area of localization. The priority sums for an area of localization may be used to find a distance from a requested localization.

In the exemplary localizations 900, four attributes are intersected, or contribute, to the localizations: language 902, country 904, age group 906, and gender 908. Although four attributes are illustrated, any number could be used. It should be noted that the illustrated attributes and resulting localizations may represent multiple sets of targets (e.g., combinations of 700, 802, 804, 806, 808), including pre-existing targets and/or merely hypothetical targets. In other words, attributes be used in various combinations to yield different targets and resulting localizations.

A requested target may be able to rely on pre-existing localizations to provide a user with a localized environment of resources. For example, if a user requests or can benefit from a localization according to the two attributes "country" 904 and "gender" 908, then a pre-existing target that yields a localization area with a priority sum representative of these two attributes (in this case six), as shown by the localized area 910, will meet a user's needs. If the user requests or would benefit from a localization of all four shown attributes, language 1902, country 904, age group 906, and gender 908, then a pre-existing target that yields a localization area with a priority sum representative of these four attributes (in this case ten), as shown by the localized area 912, will meet the user's needs. But if the resources to be localized are very numerous, e.g., worldwide, then if the localization area 912 with a priority of ten does not exist (e.g., the process of localizing has not been performed for that localization area 912) then an exemplary content management system can use pre-established localizations having the least distance for the desired localization, e.g., localization areas 914 with a priority sum of seven, and localization area 910 with a priority sum of six.

In some implementations, an exemplary content management system can intersect two or more pre-existing localization areas (e.g., 910, 914) to achieve an approximation or an exact match of a desired localization area (e.g., 912) without having to perform a localization from scratch using each individual attribute or value in a requested target. Thus, if an example target prompts for a localization specified by values for five attributes, and a pre-existing target has already yielded a localization using four of the five values, then the pre-existing localization using the four values can be intersected with the value of the fifth attribute without performing a completely new global localization using individual values already localized by the pre-existing target. A resulting localization based on values for attributes that are close but not exact to those requested or that contains attributes that are close but not exact to those requested may yield a localization that is not as specific as that which could be attained with values and attributes that match the request exactly. The additional area of localization, however (e.g., localized area 916 added onto localized area 912, that latter which would represent an exact match of values and attributes of a target), may not be discernable to a user, and may be presented to a user very quickly with no additional processing, since the user's needed localization may be only a minor refinement or intersection of pre-existing localizations. Hence, the subject matter can allow quick, highly specific localizations using pre-existing resources and localizations.

In some implementations, pre-existing localizations of resources are known as "releases." A release can be one or more localizations of resources and/or content elements, for example, performed on a certain date. If content elements are added or subtracted from the information universe then another release of the one or more localizations may be called for to keep an exemplary content management system updated. It may be of more benefit to keep past releases available than to purge them, when creating an updated release. In some implementations, a release may also be a way to match content to characteristics of particular systems, that is, different systems may use the same data in slightly different ways, and different releases of the same localizations may take into account the differences between the systems: e.g., rather than purging one system of data to start localizations from scratch, different releases of a localization may be used to afford adaptability of the content.

In some implementations, modules may also be used, each module being a logical way of grouping resources together. A user interface, for example, may group resources together for the purpose of facilitating the interface. Hence, in some implementations, a user may select or be presented with a content management environment in which a release is selectable, modules are selectable, and localization criteria, i.e., targets, are selectable. After an environment is selected, a user can then request data (i.e., instances of content elements) from the exemplary content management system.

Figure 10:
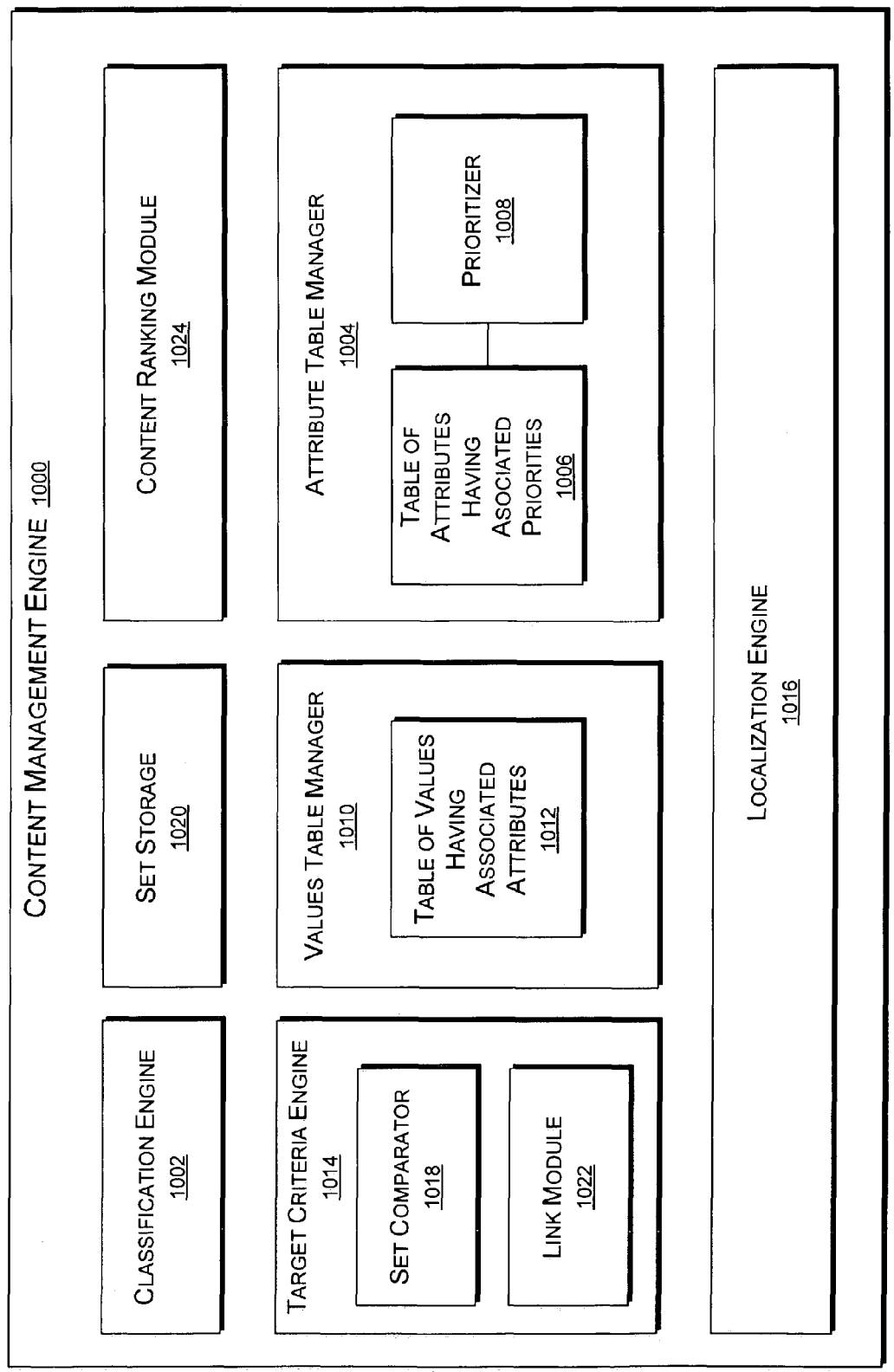
FIG. 10 is a block diagram of an exemplary content management engine.

FIG. 10 shows an exemplary content management engine 1000. A classification engine 1002, attribute table manager 1004, values table manager 1010, target criteria engine 1014, and localization engine 1016 are included in one implementation. A table of attributes having associated priorities 1006 and a prioritizer 1008 are associated with the attribute table manager 1004. A table of values having associated attributes 1012 is associated with the values table manager 1010. The exemplary content management engine 1000 may also include a set comparator 1018, set storage 1020, and a link module 1022. A content ranking module 1024 can also be included.

The classification engine 1002 determines and/or assigns attributes and values to information resources in an information system, for example, if the association between resources and attributes is not already pre-existing or not ascertainable by the exemplary content management engine 1000. A resource, for instance, such as a hyperlink, may exist in seven different language versions. An exemplary classification engine 1002 makes sure that the content management engine 1000 can find and read attributes of resources and content elements. In some implementations, the function of a classification engine 1002 can be performed at least in part by a language, application, and/or platform employed to perform the subject matter.

The attribute table manager 1004 can accept user input to add and subtract attributes from the table of attributes having associated priorities 1006 and the prioritizer 1008 can likewise accept user input to assign priority weighting to attributes in the table 1006. In some implementations, the attribute table manager 1004 may automatically start with a default set of attributes or a default set of priorities for certain attributes. The attribute table manager 1004 also communicates with the other components in the content management system 1000 so that the values table manager 1010 can automatically adjust the table of values having associated attributes 1012 when attributes and added, subtracted, or changed in the table of attributes having associated priorities 1006 and the target criteria engine 1014 can automatically develop new and more specific sets of target criteria when attributes are added, etc.

The exemplary target criteria engine 1014 can create target criteria sets, e.g., via user input, consisting of one or more of the values in the values table. Of course, if a user requests target criteria that include a value not in the table of values having associated attributes 1012, the target criteria engine 1014 can approximate a target criteria set, especially as the set comparator 1018 can determine the closeness of an approximated target criteria set to a requested target criteria set using priority sums for the comparison. A target criteria set, as mentioned, designates a subset of the information resources and/or content elements in the information system based on one or more values in the set.

The exemplary localization engine 1016 makes information resources in a subset available to a user of the information system. If the content management engine 1000 is implemented in the context of an available query platform (e.g., MICROSOFT® SQL SERVER 2000, ASP.NET, SQL XML extensions, MICROSOFT® ACCESS, etc.) then the platform can assist or be the exemplary localization engine 1016 (Microsoft Corporation, Redmond, Wash.). The subject matter can variously employ a relational database as a backend, and use hash tables, etc., to perform the tasks of making a subset of resources and/or content elements (designated by the exemplary content management engine 1000) available to a user or set of users. In other words, some aspects of the subject matter can be implemented using at least in part, commercially available computing means.

The exemplary target criteria set comparator 1018 can compare priority sums of two or more target criteria sets. This allows the exemplary content management engine 1000 to rank target criteria sets with respect to closeness or distance from a requested target criteria set. An exemplary content management engine 1000 may also include a space for set storage 1020, i.e., for storing sets of localization target criteria 700.

In some implementations, the content management engine 1000 includes a link module 1022 to associate a preferred target criteria set to each information resource and/or to each content element included in each of the information resources. A content ranking module 1024 can compare a priority sum of each preferred target criteria set linked to content elements included in an information resource to the priority sum of the target criteria set linked to the information resource itself and present a user with ranked or preferred content elements according to the comparison result.

Figure 11:
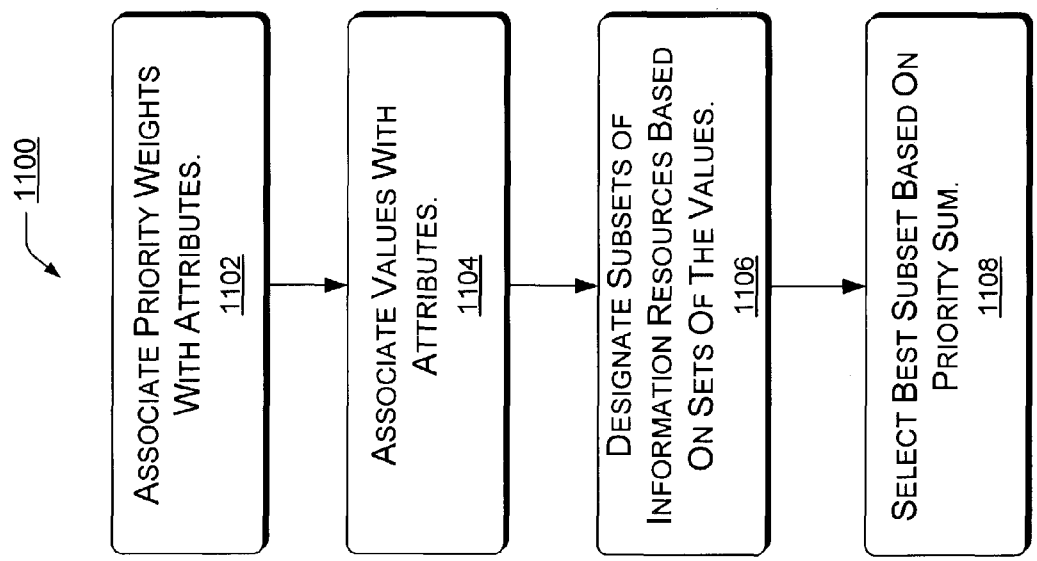
FIG. 11 is a flow diagram of an exemplary method of performing some aspects of the subject matter.

FIG. 11 shows an exemplary method 1100 of managing content. In the flow diagram, the operations are summarized in individual blocks. The operations of the exemplary method 1100 may be performed in hardware and/or as machine-readable instructions (software or firmware) that can be executed by a processor or a device, such as a device that includes or comprises an exemplary content management engine 1000.

At block 1102, priority weight values are associated with attributes in a dynamic list of attributes associated with information resources in an information system.

At block 1104, instances of attribute values are associated with corresponding attributes in a dynamic list of attribute values.

At block 1106, subsets of the information resources are designated based on respective sets of one or more of the attribute values.

At block 1108, a subset that most accurately fits the target (i.e., the subset of information resources having attributes that best describe a desired user environment or need) is selected based on comparison of respective priority sums, wherein a priority sum is obtained by summing priority weight values associated with each attribute value in a set of one or more of the attribute values used to designate a subset (i.e., a target criteria set).

Figure 12:
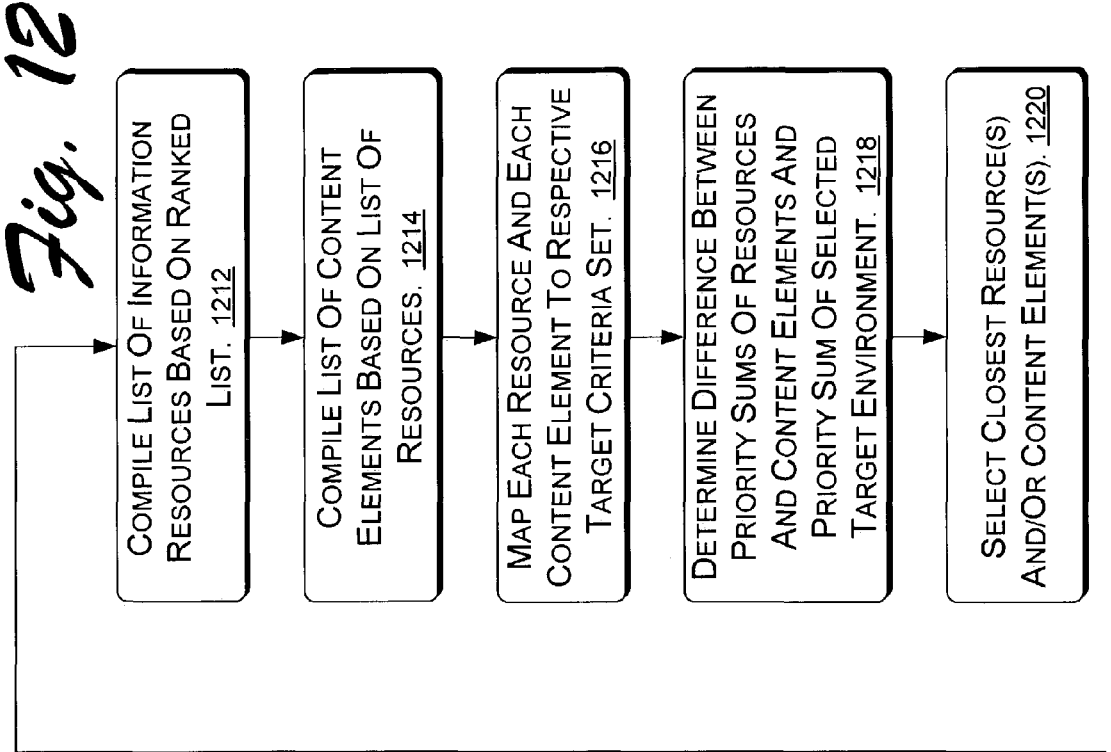
FIG. 12 is a flow diagram of another exemplary method of performing some aspects of the subject matter.
Figure 12:
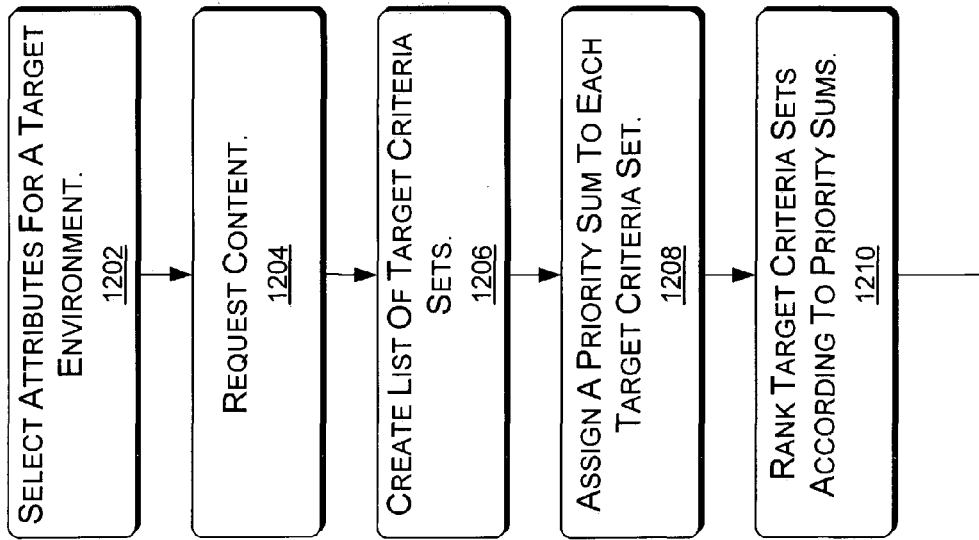

FIG. 12 shows another exemplary method 1200 of managing content. In the flow diagram, the operations are summarized in individual blocks. The operations of the exemplary method 1200 may be performed in hardware and/or as machine-readable instructions (software or firmware) that can be executed by a processor or a device, such as a device that includes an exemplary content management engine 1000.

At block 1202, attributes for a target environment are selected relative to a user or a user need. At the end of the exemplary method 1200, the selected target environment will be "created" by presenting the user with information resources and content elements that have attributes that match the target. For example, if the user is a French youth, then the target environment might consist of "France" and "French" and "age 13 to 19." Information resources with matching attributes would then be presented to the user, e.g., content elements in French, etc.

At block 1204, content is requested from the information system.

At block 1206, a list of possible or known target criteria sets is produced based on the selected target environment.

At block 1208, each target criteria set is assigned a priority sum according to attributes represented by values in each set.

At block 1210, each set in the list of target criteria sets is ranked according to the priority sums.

At block 1212, a list of information resources is compiled based on the selected target environment and the ranked list of target criteria sets.

At block 1214, a list of content elements (instances) is compiled based on instances of content that apply to the list of information resources, the list of target criteria, and the target environment selected.

At block 1216, each information resource and/or each content element is mapped or has previously been mapped to a preferred set of target criteria having a priority sum.

At block 1218, the difference (distance) is determined between the priority sum of the set of target criteria that describes the target environment selected by the user and the priority sum of the preferred set of target criteria mapped to each information resource and/or content element.

At block 1220, the information resource(s) and/or the content element(s) associated with the least distance from the target environment selected by the user are ranked first. Within an information resource, content elements may be mapped to different sets of target criteria. The difference between a priority sum of a set of target criteria mapped to a content element and the priority sum of a set of target criteria mapped to the information resource possessing the content element may be calculated to establish a rank between content elements in the information resource.

A user may want to start out with content that is most specific to the user's environment. An exemplary content management system can automatically locate the most specific information that exists in the exemplary system for each item of content the user is localizing, and return it to the user.

But a user can also prefer a more general target environment than the system would otherwise automatically choose. For example, a Japanese user may want the Japanese view of an information resource to always include the English version of the resource. A user can have an exemplary system obtain a content string in Japanese, find the string in English, and try to translate it and localize it.

This user preference for a more general target environment than automatically provided by an exemplary system by default can rise to the level of an override. For example, regardless of any other circumstance, a user may select to see resources with a "Belgium" value for a country attribute.

Figure 13:
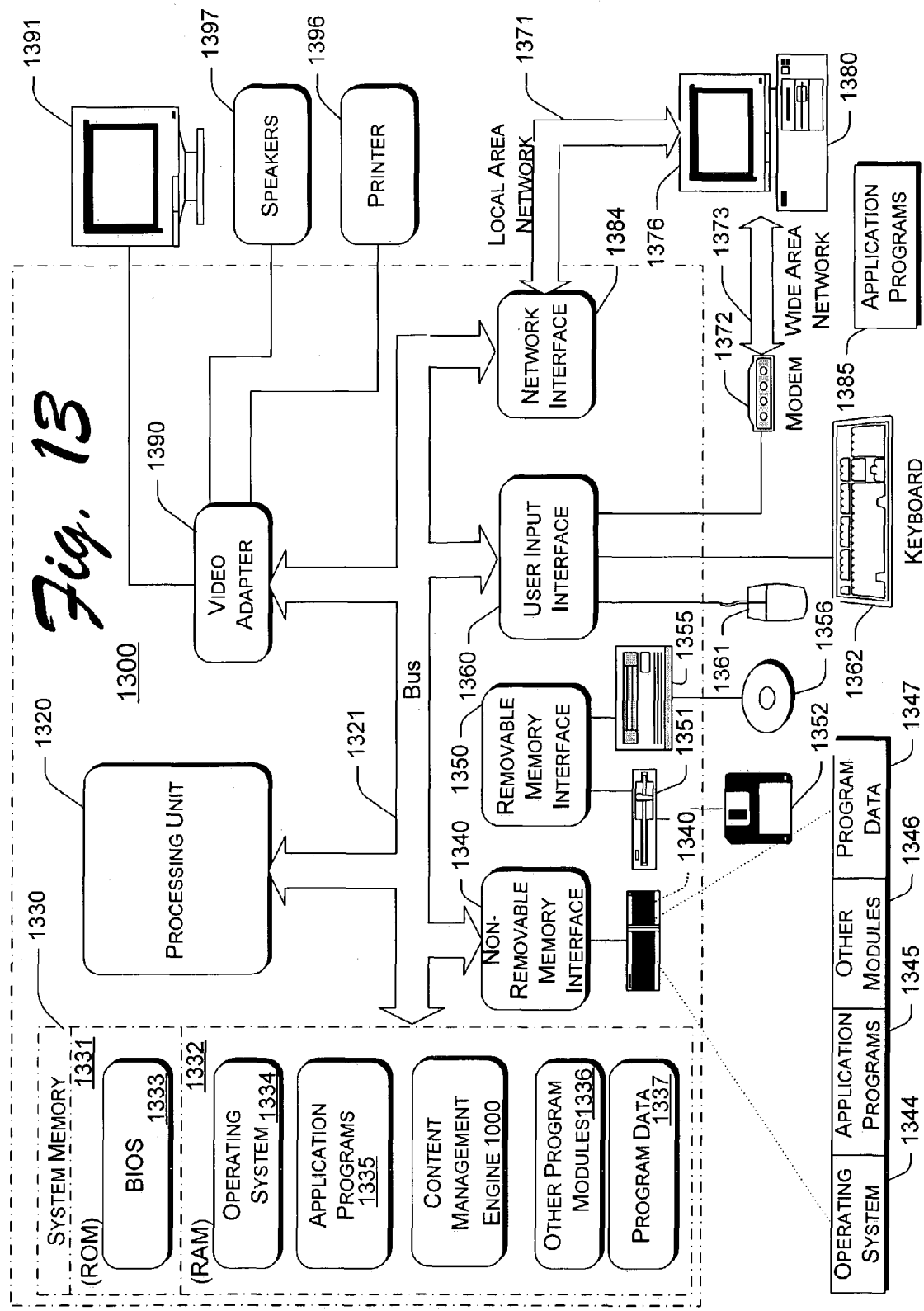
FIG. 13 is a block diagram of an exemplary computing device suitable for use with the subject matter.

FIG. 13 shows an exemplary computer 1300 providing a computing environment in which aspects of the subject matter could be practiced. The components of exemplary computer 1300 may include, but are not limited to, a processing unit 1320, a system memory 1330, and a system bus 1321 that couples various system components including the system memory 1330 to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 1300 typically includes a variety of computer-readable media. Computer-readable media can be any available media that can be accessed by exemplary computer 1300 and includes both volatile and nonvolatile media, removable and non-removable media. By way of example, and not limitation, computer-readable media may comprise computer storage media and communication media. Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 1300. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within exemplary computer 1300, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, the exemplary content management engine 1000, application programs 1335, other program modules 1336, and program data 1337. Although the exemplary content management engine 1000 is depicted as software in random access memory 1332, other implementations of an exemplary content management engine 1000 can be hardware or combinations of software and hardware.

The exemplary computer 1300 may also include other removable/non-removable, volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface such as interface 1350.

The drives and their associated computer storage media discussed above and illustrated in FIG. 13 provide storage of computer-readable instructions, data structures, program modules, and other data for exemplary computer 1300. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. A user may enter commands and information into the exemplary computer 1300 through input devices such as a keyboard 1362 and pointing device 1361, commonly referred to as a mouse, trackball, or touch pad. Other input devices (not shown) may include a microphone, joystick, game pad, satellite dish, scanner, or the like. These and other input devices are often connected to the processing unit 1320 through a user input interface 1360 that is coupled to the system bus, but may be connected by other interface and bus structures, such as a parallel port, game port, or a universal serial bus (USB). A monitor 1391 or other type of display device is also connected to the system bus 1321 via an interface, such as a video interface 1390. In addition to the monitor 1391, computers may also include other peripheral output devices such as speakers 1397 and printer 1396, which may be connected through an output peripheral interface 1395.

The exemplary computer 1300 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to exemplary computer 1300, although only a memory storage device 1381 has been illustrated in FIG. 13. The logical connections depicted in FIG. 13 include a local area network (LAN) 1371 and a wide area network (WAN) 1373, but may also include other networks. Such networking environments are commonplace in offices, enterprise-wide computer networks, intranets, and the Internet.

When used in a LAN networking environment, the exemplary computer 1300 is connected to the LAN 1371 through a network interface or adapter 1370. When used in a WAN networking environment, the exemplary computer 1300 typically includes a modem 1372 or other means for establishing communications over the WAN 1373, such as the Internet. The modem 1372, which may be internal or external, may be connected to the system bus 1321 via the user input interface 1360, or other appropriate mechanism. In a networked environment, program modules depicted relative to the exemplary computer 1300, or portions thereof, may be stored in the remote memory storage device. By way of example, and not limitation, FIG. 13 illustrates remote application programs 1385 as residing on memory device 1381. It will be appreciated that the network connections shown are exemplary and other means of establishing a communications link between the computers may be used.

CONCLUSION

The foregoing describes an exemplary resource classification and prioritization system and related methods. The subject matter described above can be implemented in hardware, in software, or in both hardware and software. In certain implementations, the exemplary resource classification and prioritization system and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method for localizing information resources relevant to a user, the method implemented at least in part by a computing device, comprising:
    establishing an extensible list of attributes of various information resources in an information system and assigning a user-selectable priority weight to each of the attributes in the list of attributes, wherein each information resource is classified according to one or more attributes;

establishing an extensible list of values for the attributes in the extensible list of attributes, wherein each value is associated in the list with its corresponding attribute;

selecting a first set of one or more of the values from the extensible list of values to be a first set of target criteria to designate a subset of the information resources relevant to the user based at least in part on priority weights selected by the user, wherein the priority weights of each attribute associated with a value in the first set of target criteria are added to obtain a priority sum for the first set of target criteria;

selecting additional sets of target criteria to designate a spectrum of subsets of the information resources relevant to the user, wherein the additional sets of target criteria include priority weights selected by the user, and wherein the priority weights of each attribute associated with a value for each of the additional sets of target criteria are added respectively to obtain different priority sums for each of the additional sets of target criteria;

comparing the different priority sums of each additional set of target criteria to the priority sum of the first set of target criteria to determine whether each of the additional sets of target criteria designates a more general or a more specific subset of information resources relevant to the user than designated by the first set of target criteria; and localizing information resources and content elements in the information system for the user of the information system by presenting the user with one or more of the subsets of the information resources relevant to the user which are designated by one or more of the first set of target criteria and the additional sets of target criteria.

2. The method as recited in claim 1, wherein each information resource includes one or more content elements and each content element can be classified according to one or more attributes.

3. The method as recited in claim 2, wherein each resource and each content element in each resource is linked with a set of target criteria and if a resource is designated as a member of a subset by a set of target criteria then priority sums of each respective set of target criteria linked to each content element in the resource are compared to the priority sum of the set of target criteria linked to the resource to rank the content elements in the resource according to similarity with the priority sum of the set of target criteria linked to the resource.

4. The method as recited in claim 1, wherein a database structure of the information system remains unchanged during expansion and contraction of the extensible list of attributes and the extensible list of values.

5. The method as recited in claim 4, further comprising adding attributes to the extensible list of attributes.

6. The method as recited in claim 5, further comprising adding values associated with the added attributes to the extensible list of values.

7. The method as recited in claim 6, further comprising selecting a set of values including one or more of the added attributes to designate a subset of the information resources with greater specificity.

8. The method as redted in claim 1, wherein each value of each attribute of each information resource is included in the extensible list of values.

9. One or more computer storage media encoded with a data structure for use in comparing a priority sum of a first set of taraet criteria with different priority sums of additional sets of target criteria to determine whether each of the different sets of target criteria designates a more general or a more specific subset of content resources relevant to the user than designated by the first set of target criteria the data structure comprising:

an extensible table of attributes, wherein various content elements in an information system possess values of the attributes and wherein each attribute in the extensible table of attributes is associated with a priority weight assigned by a user and which is used for weighting purposes during a localization of content elements relevant to the user;

an extensible table of values of the attributes, wherein each value is associated with its corresponding attribute, and wherein each attribute is associated with a priority weight selected by the user; and multiple sets of one or more values, taken from the extensible table of values to designate multiple subsets of content elements relevant to the user, wherein one of the multiple sets represents a first set of target criteria, and wherein others of the multiple sets represent different sets of target criteria, and wherein a priority weight of each attribute associated with each value in each set is summed to determine a priority sum of the respective set and the priority sums of respective sets in the multiple sets can be compared to determine whether each of the different sets of target criteria designates a more general or a more specific subset of content resources relevant to the user than designated by the first set of target criteria.

10. The one or more computer stoeage media as recited in claim 9, wherein the data structure further comprises a list of the multiple sets, wherein the list of multiple sets is arranged according to a numerical order of the respective priority sums of sets in the multiple sets.

11. A content management engine embodied on computer storage media,comprising:

a classification engine to determine attributes of a plurality of information resources in an information system;

an attribute table manager in communication with a dynamic table of attributes and priorities, wherein the dynamic table of attributes and priorities includes the attributes of the plurality of information resources;

a prioritizer which accepts user input to assign priority weights to each attribute in the table of attributes and priorities;

a values table manager in communication with a dynamic table of values, wherein each value and its associated attribute possessed by one of the information resources is represented in the table of values;

a target criteria engine to create target criteria sets of one or more of the values, wherein a target criteria set designates a subset of the information resources in the information system based on the one or more values; and a localization engine to make information resources in the subset available to a user of the information system, having a target criteria set comparator to compare a priority sum of priority weights assigned by a user for a first target criteria set to a priority sum of priority weights assigned by the user for a second target criteria set to determine which of first and second target criteria sets locate information resources which are more relevant to the user, wherein a priority sum is the sum of the priority weights of the values in a given target criteria set.

12. The content management engine as recited in claim 11, wherein the target criteria sets are stored by the content management engine.

13. The content management engine as recited in claim 12, wherein the target criteria sets are ranked according to their respective priority sums.

14. The content management engine as recited in claim 12, wherein the target criteria set comparator compares a priority sum of a target criteria set requested by a user to a priority sum of a stored target criteria set.

15. The content management engine as recited in claim 11, further comprising a target criteria set link module to link a preferred target criteria set to each information resource and each content element included in each information resource.

16. The content management engine as recited in claim 15, further comprising a content ranking module to compare a priority sum of each preferred target criteria set linked to content elements included in an information resource to the priority sum of the target criteria set linked to the information resource and rank the content elements according to a comparison result.

17. A computing system, comprising:
an information system including: a processing unit and system memory;
a plurality of information resources, each having one or more attributes;
an extensible table of the attributes, wherein each attribute is assigned a priority weight by a user;
an extensible table of values for the attributes, wherein each value is associated with its corresponding attribute; and
sets of the values, wherein each set specifies a subset of the information resources relevant to the user, and wherein each set can be differentiated as being a more general or a more specific subset of information relevant to the user by the sum of priority weights assigned by the user to each attribute represented by a value in each set; and
a content management engine, including:
a classification engine to determine the attributes of the plurality of information resources in the information system:
an attribute table manager in communication with the extensible table of attributes, wherein the extensible table of attributes includes the attributes of the plurality of information resources;
a prioritizer which accepts user input to assign the priority weights to each attribute in the extensible table of attributes;
a values table manager in communication with the extensible table of values, wherein each value and its associated attribute possessed by one of the information resources is represented in the extensible table of values;
a target criteria engine to create target criteria sets of one or more of the values, wherein a target criteria set designates a subset of the information resources in the information system based on the one or more values; and
a localization engine to make information resources in the subset available to a user of the information system, having a target criteria set comparator to compare a priority sum of nriority weights assigned by the user for a first taroet criteria set to a priority sum of priority weights assigned by the user for a second target criteria set to determine which of first and second taruet criteria sets locate information resources which are more relevant to the user, wherein a priority sum is the sum of the priority weights of the values in a given target criteria set.

18. The computing system as recited in claim 17, wherein the extensible table of the attributes and the extensible table of values can be expanded without changing a database structure of the information system.

19. The computing system as recited in claim 17, wherein each information resource includes various content elements.

20. The computing system as recited in claim 19, wherein an information resource and each content element is associated with a preferred set of values for specifying a subset of information resources that includes the information resource or the content element.

21. The computing system as recited in claim 20, wherein a content element included in an information resource is ranked relative to other content elements in the information resource according to a magnitude of a difference between a priority sum associated with the content element and a priority sum associated with the information resource, wherein a priority sum is a sum of weights of each attribute represented by a value in the preferred set of values associated with each information resource and each content element.

* * * * *

UNITED STATES PATENT AND TRADEMARK OFFICE
CERTIFICATE OF CORRECTION

PATENT NO. : 7,359,905 B2
APPLICATION NO. : 10/602574
DATED : April 15, 2008
INVENTOR(S) : Brian R. Tunning et al.

It is certified that error appears in the above-identified patent and that said Letters Patent is hereby corrected as shown below:

In column 3, line 43, delete "(herein"target")" and insert --(herein "target")--, therefor.

In column 3, line 47, delete "(herein"target" and insert --(herein "target--, therefor.

In column 3, line 52-53, delete "of"Japanese"" and insert -- of "Japanese"--, therefor.

In column 3, line 53, delete "the"Japanese"" and insert --the "Japanese"--, therefor.

In column 6, line 25, delete "as"target")," and insert --as "target"),--, therefor.

In column 6, line 48, delete "100" and insert --700--, therefor.

In column 8, line 33, after "attributes" insert --may--.

In column 15, line 65, in Claim 8, delete "redted" and insert --recited--, therefor.

In column 16, line 3, in Claim 9, delete "taraet" and insert --target--, therefor.

In column 16, line 7, in Claim 9, after "criteria" insert --,--.

In column 16, line 34, in Claim 10, delete "stoeage" and insert --storage--, therefor.

In column 16, line 41, in Claim 11, delete "media,comprising:" and insert
--media, comprising:--, therefor.

In column 17, line 46, in Claim 17, delete "system:" and insert --system;--, therefor.

In column 18, line 18, in Claim 17, delete "nriority" and insert --priority--, therefor.

Signed and Sealed this
Twenty-second Day of February, 2011

David J. Kappos
*Director of the United States Patent and Trademark Office*

CERTIFICATE OF CORRECTION (continued)
U.S. Pat. No. 7,359,905 B2

In column 18, line 19, in Claim 17, delete "taroet" and insert --target--, therefor.

In column 18, line 21, in Claim 17, delete "taruet" and insert --target--, therefor.